US006605141B1

(12) United States Patent
Lee et al.

(10) Patent No.: US 6,605,141 B1
(45) Date of Patent: Aug. 12, 2003

(54) EXHAUST GAS PROCESSING APPARATUS

(75) Inventors: Ching-Tien Lee, Hsin-Chu Hsien (TW); Wei-Jen Mai, Hsin-Chu (TW)

(73) Assignee: Powerchip Semiconductor Corp., Hsin-Chu (TW)

(*) Notice: Subject to any disclaimer, the term of this patent is extended or adjusted under 35 U.S.C. 154(b) by 0 days.

(21) Appl. No.: 10/249,104

(22) Filed: Mar. 17, 2003

(51) Int. Cl.[7] .............................................. B01D 53/06

(52) U.S. Cl. ............................ 96/125; 96/132; 96/142; 96/143; 96/150

(58) Field of Search ..................... 95/113, 143; 96/123, 96/125, 130, 132, 142–144, 150

(56) References Cited

U.S. PATENT DOCUMENTS

| | | | | |
|---|---|---|---|---|
| 4,786,301 A | * | 11/1988 | Rhodes | 62/271 |
| 5,076,821 A | * | 12/1991 | Bruhnke et al. | 96/130 |
| 5,167,679 A | * | 12/1992 | Maekawa et al. | 96/125 |
| 5,814,132 A | * | 9/1998 | Grime et al. | 95/123 |
| 6,080,227 A | * | 6/2000 | Kurosawa et al. | 96/111 |
| 6,083,304 A | * | 7/2000 | Fujimura | 96/145 |

* cited by examiner

Primary Examiner—Robert H. Spitzer
(74) Attorney, Agent, or Firm—Winston Hsu

(57) ABSTRACT

An exhaust gas processing apparatus is provided. The apparatus includes a rotor concentrator installed in an inlet, an active carbon adsorption system installed in an outlet, and a switch located between the zeolite rotor concentrator and the active carbon adsorption system for selecting any one (or both) of the two systems to process exhaust gases.

20 Claims, 7 Drawing Sheets

EXHAUST GAS PROCESSING APPARATUS

BACKGROUND OF INVENTION

1. Field of the Invention

The present invention relates to an apparatus for processing discharging exhaust gas, and more particularly, to an apparatus combining a zeolite rotor concentrator and an active carbon adsorption system together so that the setting cost is lowered and the processing efficiency is raised.

2. Description of the Prior Art

As the manufacturing process in the semiconductor industry becomes more and more complicated, many poisonous organic gases come with chemical reactions in the process. For protecting the environment and obeying related regulations that are more and more strict, an apparatus for processing exhaust gas is required. Moreover, the setting cost is as important as the efficiency in designing an exhaust gas processing apparatus.

Please refer to FIG. 1. FIG. 1 is a schematic diagram of an exhaust gas processing apparatus 10 according to the prior art. As shown in FIG. 1, the exhaust gas processing apparatus 10 comprises a front fan 12, a zeolite rotor concentrator 14, a switch 16, and a chimney 18. The exhaust gas is introduced into the exhaust gas processing apparatus 10 by the front fan 12 installed in an inlet, processed by the zeolite rotor concentrator 14, and discharged by the chimney 18. Because the organic gas (say IPA, PGMEA, or EKC) contained in the exhaust gas is condensed and burned by the zeolite rotor concentrator 14, the processing efficiency of the zeolite rotor concentrator 14 will deteriorate when the zeolite ages. In this case, the zeolite rotor concentrator 14 is shut down for examination and necessary measures are adopted (such as replacing zeolite) to recover the normal processing function. The exhaust gas cannot be processed during the examination or zeolite replacement period; therefore the exhaust gas is switched by the switch 16 and discharged via another pipeline and the chimney 18 without being processed. During this period the unprocessed exhaust gas will pollute the environment and violate the environmental regulations. In view of this problem, the pause time of the zeolite rotor concentrator 14 should be taken into consideration when designing new exhaust gas processing models.

Please refer to FIG. 2. FIG. 2 is a schematic diagram of another exhaust gas processing apparatus according to the prior art. As shown in FIG. 2, the exhaust gas processing apparatus 20 comprises a front fan 22, a switch 23, a first zeolite rotor concentrator 24, a second zeolite rotor concentrator 26, and a chimney 28. Normally the exhaust gas processing apparatus 20 operates in the same manner with the exhaust gas processing apparatus 10, the exhaust gas is introduced by the front fan 22, processed by the first zeolite rotor concentrator 24, and discharged via the chimney 28. The difference between the two apparatuses is that when the first zeolite rotor concentrator 24 needs examining or replacement of the zeolite because of zeolite aging or other reasons, the exhaust gas is switched by the switch 23 and processed by the second zeolite rotor concentrator 26. In this case the exhaust gas processing apparatus is able to operate unceasingly.

Although the exhaust gas processing apparatus 20 can solve the pause time problem, it is an impractical design. To set an exhaust gas processing apparatus with a second zeolite rotor concentrator (say flux: 870CMM; concentration: 300 ppm), the setting cost will raise about 1 million US dollars but the average operating time is only five days a year. Therefore a high efficiency and low cost exhaust gas processing apparatus is eagerly required.

SUMMARY OF INVENTION

It is therefore a primary objective of the claimed invention to provide an exhaust gas processing apparatus that can solve the above-mentioned pause time problem.

It is another objective of the claimed invention to provide an exhaust gas processing apparatus that can improve processing efficiency, and lower the setting cost.

According to the claimed invention, an exhaust gas processing apparatus having a front fan, a zeolite rotor concentrator, an active carbon adsorption system, a switch, and a chimney is provided. The switch can make the zeolite rotor concentrator and the active carbon adsorption system connect together in series or in parallel. Moreover, the exhaust gas processing apparatus includes a plurality of regulating valves for controlling the exhaust gas flux flowing to the zeolite rotor concentrator and the active carbon adsorption system in different operating modes, a back fan installed in an outlet for pumping out the exhaust gas processed by the active carbon adsorption system, and a check damper installed in the outlet for preventing the exhaust gas processed by the zeolite rotor concentrator from flowing backward to the active carbon adsorption system.

It is an advantage of the claimed invention that the active carbon adsorption system is connected to the zeolite rotor concentrator in series or in parallel so that the total processing efficiency is raised.

It is another advantage of the claimed invention that the active carbon adsorption system can replace the zeolite rotor concentrator during the examination period so that the problem of a pause time is solved. Moreover, because the exhaust gas processing apparatus of the claimed invention uses an active carbon adsorption system instead of a second zeolite rotor concentrator, the setting cost is much lower.

These and other objectives of the claimed invention will no doubt become obvious to those of ordinary skill in the art after having read the following detailed description of the preferred embodiment that is illustrated in the various figures and drawings.

DETAILED DESCRIPTION

Figure 1:
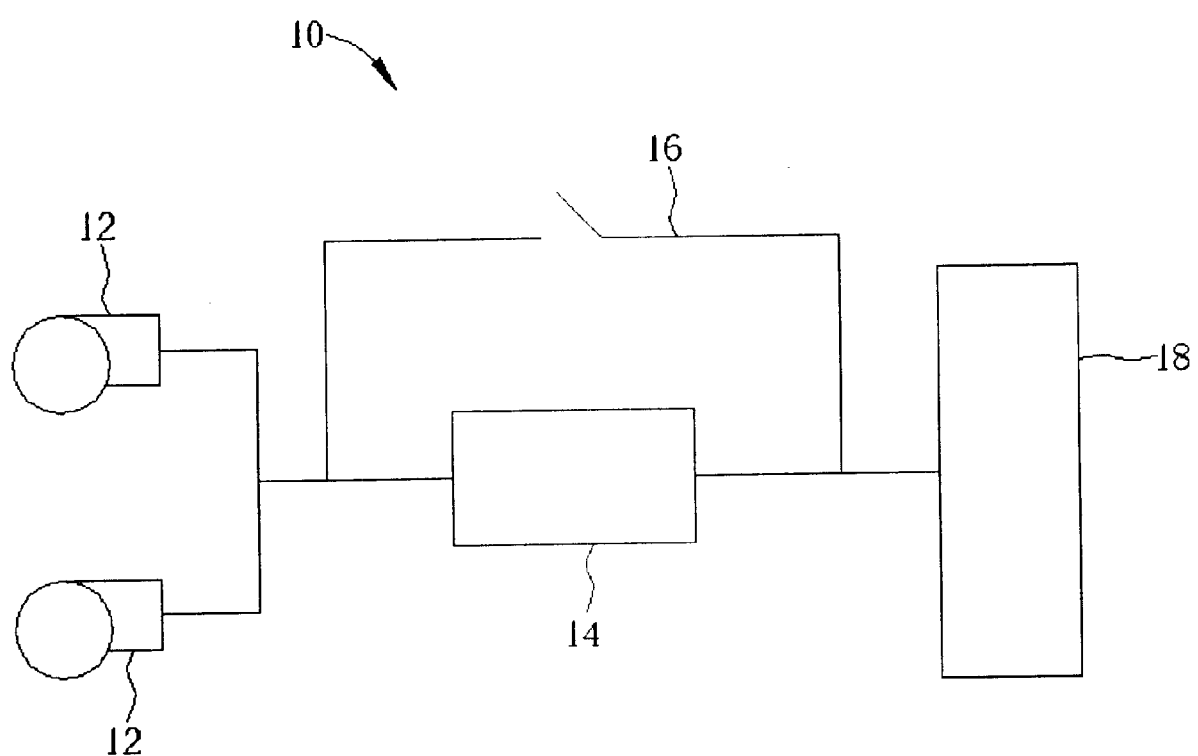
FIG. 1 is a schematic diagram of an exhaust gas processing apparatus according to the prior art.
Figure 2:
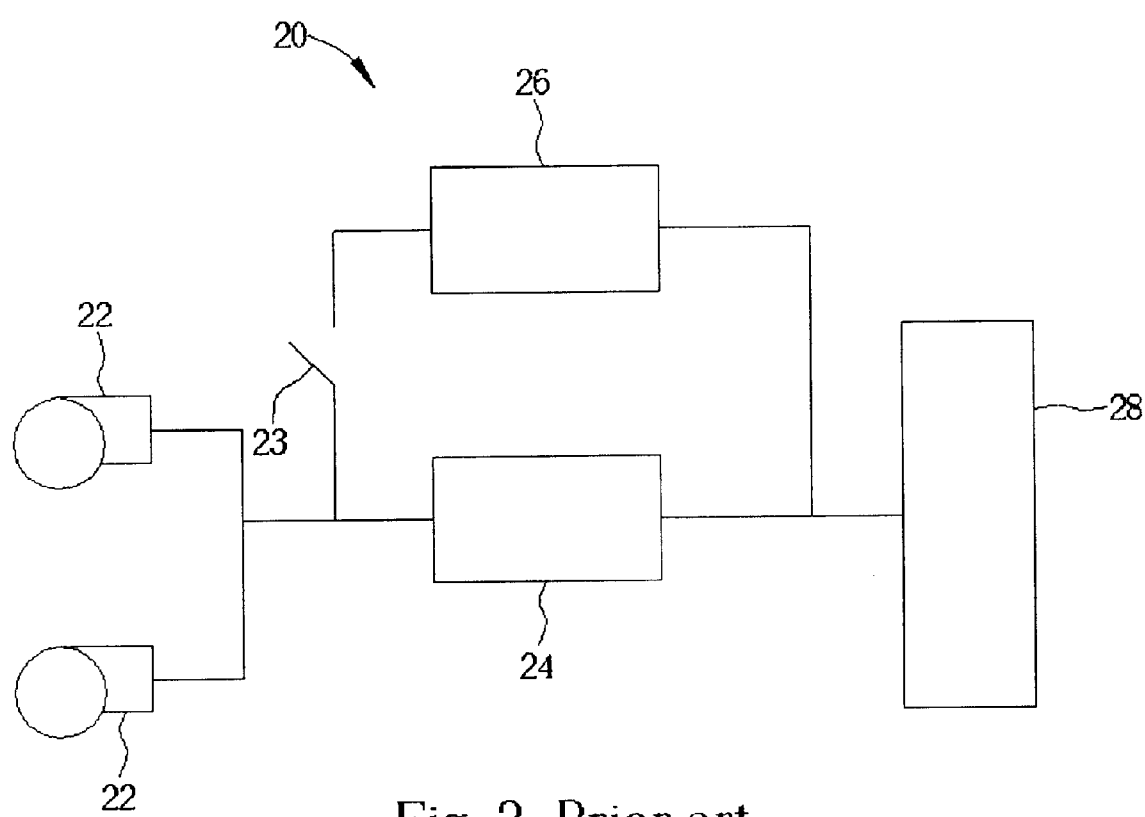
FIG. 2 is another schematic diagram of another exhaust gas processing apparatus according to the prior art.
Figure 3:
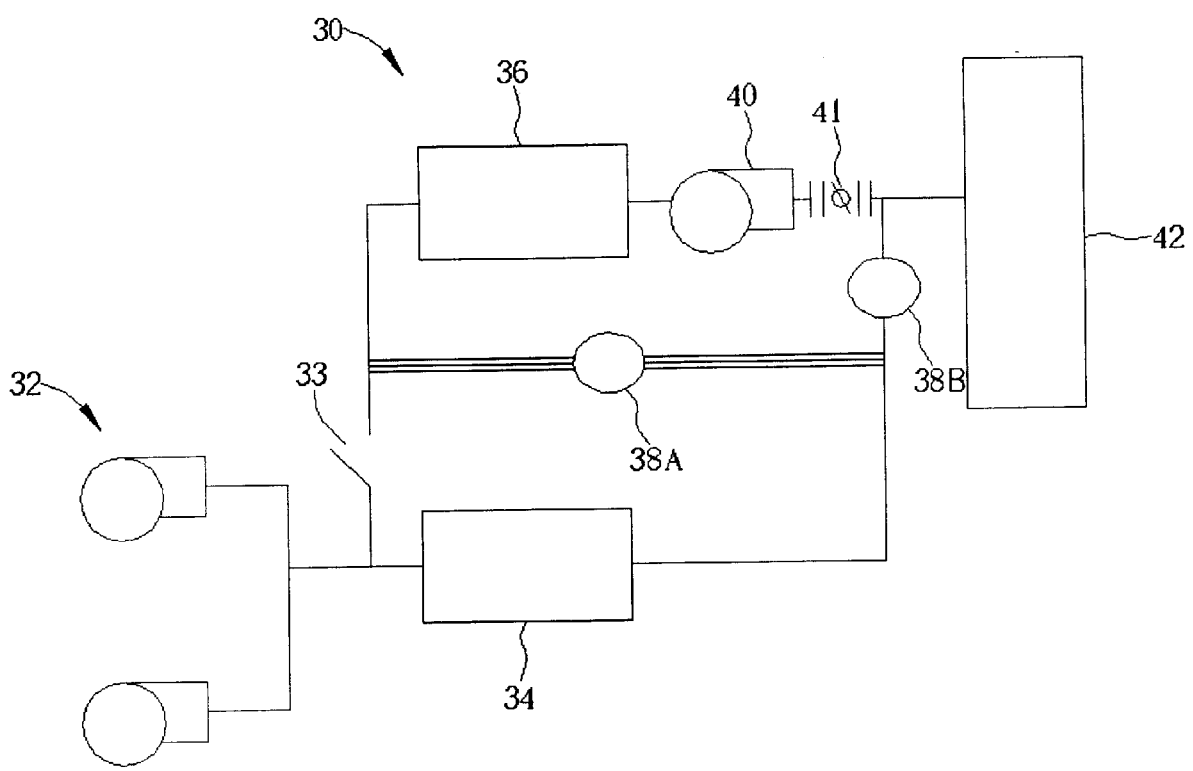
FIG. 3 is a schematic diagram of an exhaust gas processing apparatus in normal mode according the present invention.

Please refer to FIG. 3. FIG. 3 is a schematic diagram of the exhaust gas processing apparatus in normal mode according to a preferred embodiment of the present invention. As shown is FIG. 3, the exhaust gas processing apparatus 30 comprises a front fan 32 installed in an inlet, a switch 33, a zeolite rotor concentrator 34, an active carbon adsorption system 36, two regulating valves 38A and 38B, a back fan 40 installed in an outlet, a check damper 41, and a chimney 42.

The exhaust gas is introduced by the front fan 32, and processed by the zeolite rotor concentrator 34. In normal mode, the regulating valve 38A is closed while the regulating valve 38B is open so that the processed exhaust gas will only pass via the regulating valve 38B to the chimney 42. The function of the check damper 41 is to prevent the exhaust gas from flowing backward to the active carbon adsorption system 36. Also in normal mode the active carbon adsorption system 36 is off, only the zeolite rotor concentrator 34 is working, and its efficiency is set to over 90% to conform to environmental regulations.

The processing efficiency of the zeolite rotor concentrator 34 may deteriorate because of zeolite aging or other reasons. When the processing efficiency lowers to 90%, the active carbon adsorption system 36 is connected to the zeolite rotor concentrator 34 in series or in parallel for prolonging the working time of the zeolite rotor concentrator 34.

Figure 4:
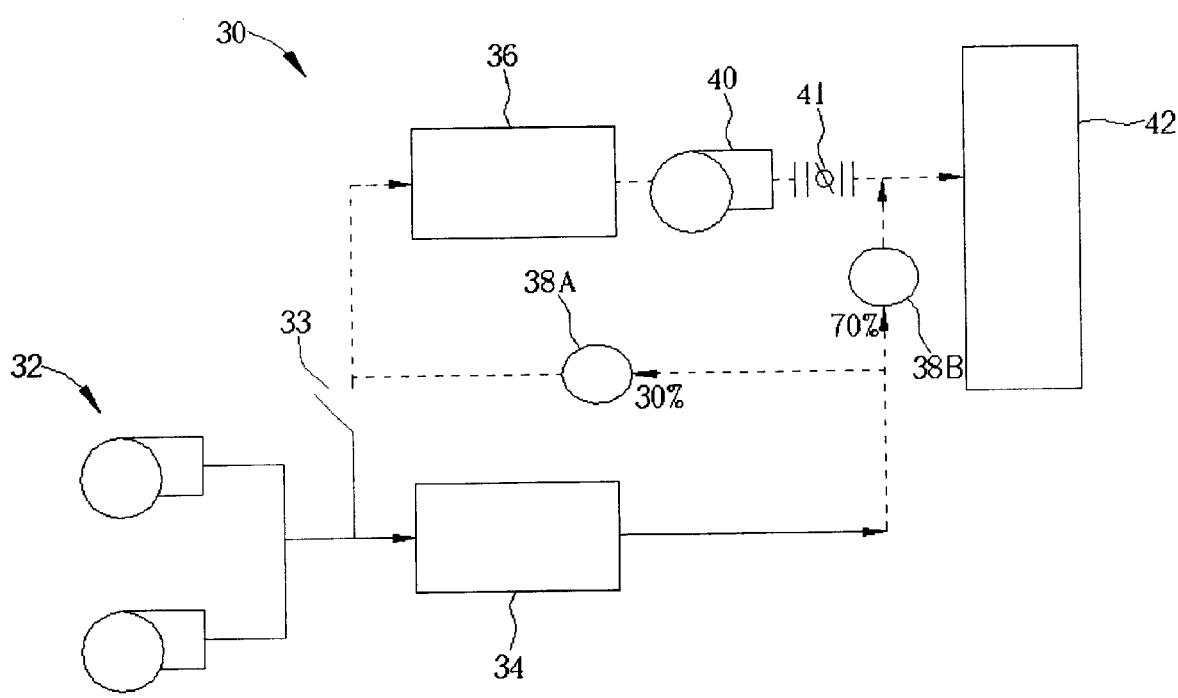
FIG. 4 is a schematic diagram of the exhaust gas processing apparatus of FIG. 3 in enhancing mode.

Please refer to FIG. 4. FIG. 4 is a schematic diagram of the exhaust gas processing apparatus in enhancing mode according to a preferred embodiment of the present invention. As shown in FIG. 4, the exhaust gas is introduced by the front fan 32, and processed by the zeolite rotor concentrator 34. In enhancing mode, the regulating valves 38A and 38B are both open so that the zeolite rotor concentrator 34 and the active carbon adsorption system 36 are connected in series. Portions of the exhaust gas processed by the zeolite rotor concentrator 34 will pass to and be reprocessed by the active carbon adsorption system 36 and pumped out to the chimney 42 by the back fan 40. The remaining exhaust gas that does not pass to the active carbon adsorption system 36 will directly be discharged out via the chimney 42. In the enhancing mode of this embodiment, the regulating valve 38A is adjusted to allow only 30% of the exhaust gas to pass, which means 30% of the exhaust gas is reprocessed by the active carbon adsorption system 36, while the other 70% is directly sent out via the chimney 42. Assuming that the processing efficiency of the zeolite rotor concentrator 34 and the active carbon adsorption system 36 are set respectively to 90% and 98%, the total processing efficiency will be 93%. It is obvious that not only the processing efficiency is raised but also the working time of the zeolite rotor concentrator 34 is prolonged.

Moreover, the zeolite rotor concentrator 34 and the active carbon adsorption system 36 can be connected in parallel. In this case, the switch 33 allows the exhaust gas to flow to both the zeolite rotor concentrator 34 and the active carbon adsorption system 36. Two regulating valves (not shown) are installed in the inlet of both systems to control the flux flowing to the two processing systems. At this time, the regulating valve 38A is closed, while the regulating valve 38B is open.

Figure 5:
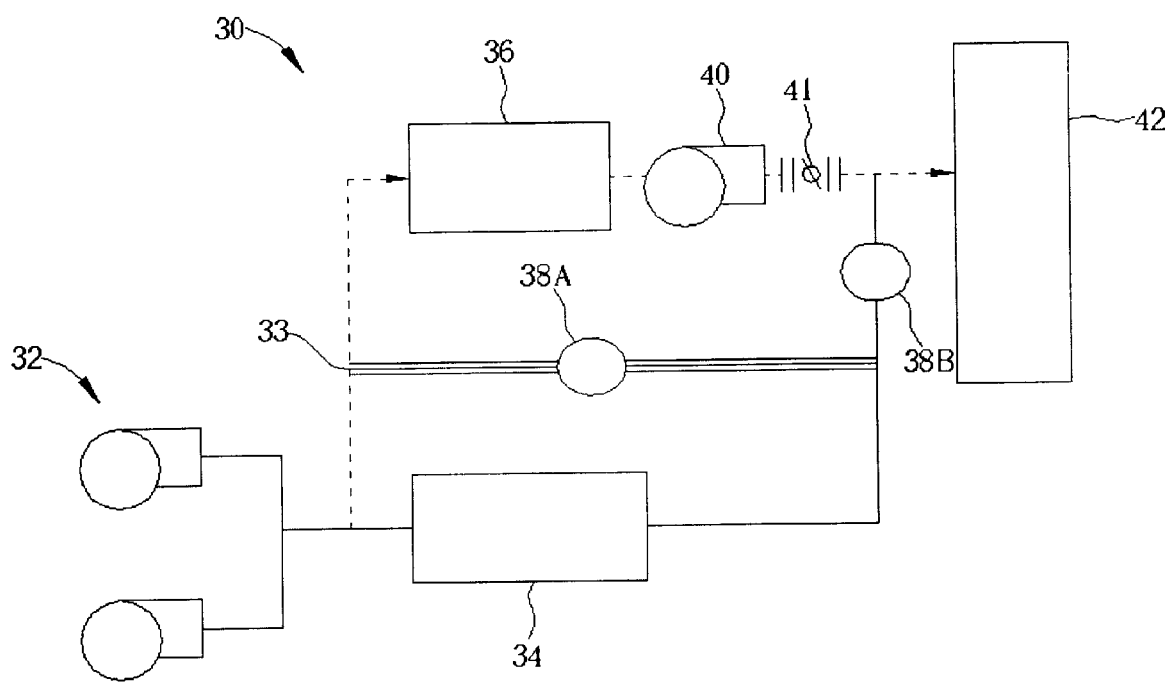
FIG. 5 is a schematic diagram of the exhaust gas processing apparatus of FIG. 3 in breakdown mode.

Please refer to FIG. 5. FIG. 5 is a schematic diagram of the exhaust gas processing apparatus in breakdown mode according to a preferred embodiment of the present invention. When the zeolite rotor concentrator 34 is in breakdown mode or needs examining, the exhaust gas processing apparatus can continue working in the breakdown mode. As shown in FIG. 5, when the zeolite rotor concentrator 34 is not working, the exhaust gas introduced by the front fan 32 is passed to the active carbon adsorption system 36 by switching the switch 33. At this time the regulating valves 38A and 38B are both closed so that the exhaust gas is processed only by the active carbon adsorption system 36 and pumped out to the chimney 42 by the back fan 40. When the zeolite rotor concentrator 34 is fixed, the exhaust gas processing apparatus will be switched to normal mode or enhancing mode.

Figure 6:
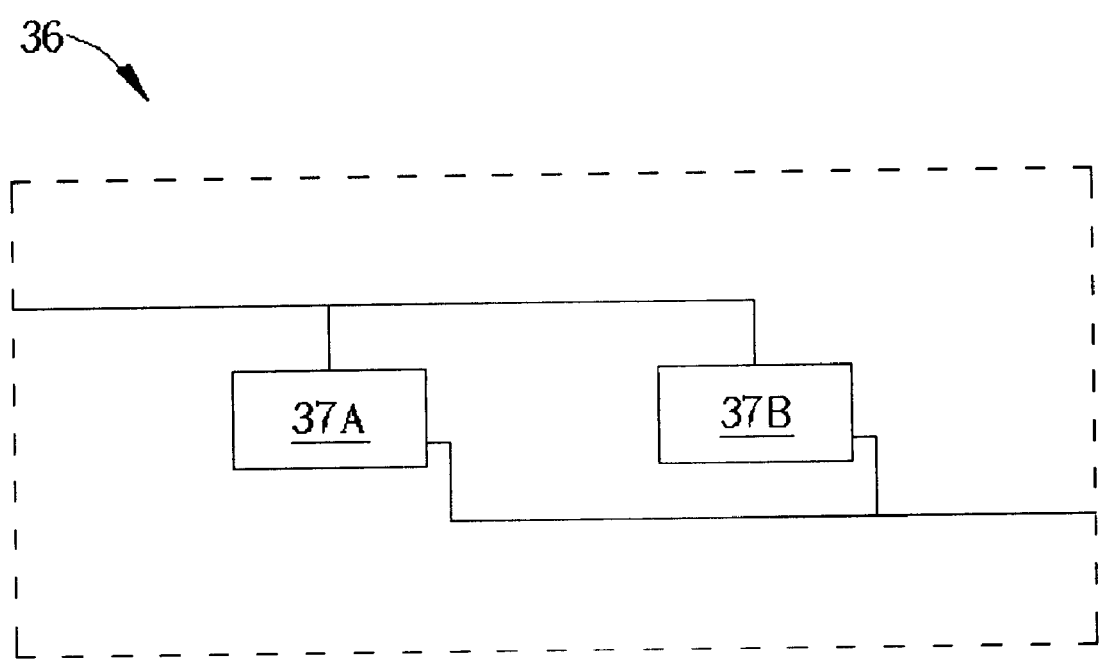
FIG. 6 is a schematic diagram of an active carbon adsorption system according to the present invention.

Please refer to FIG. 6. FIG. 6 is a schematic diagram of an active carbon adsorption system 36 according to a preferred embodiment of the present invention. As shown in FIG. 6, the active carbon adsorption system 36 comprises two adsorption tanks 37A and 37B connected in parallel, and a switch (not shown). While the active carbon adsorption system 36 operates, the exhaust gas can be processed by both the adsorption tanks 37A and 37B, or by either one of the adsorption tanks 37A and 37B respectively. When one adsorption tank operates, the other adsorption tank can be desorbed in the same time.

Figure 7:
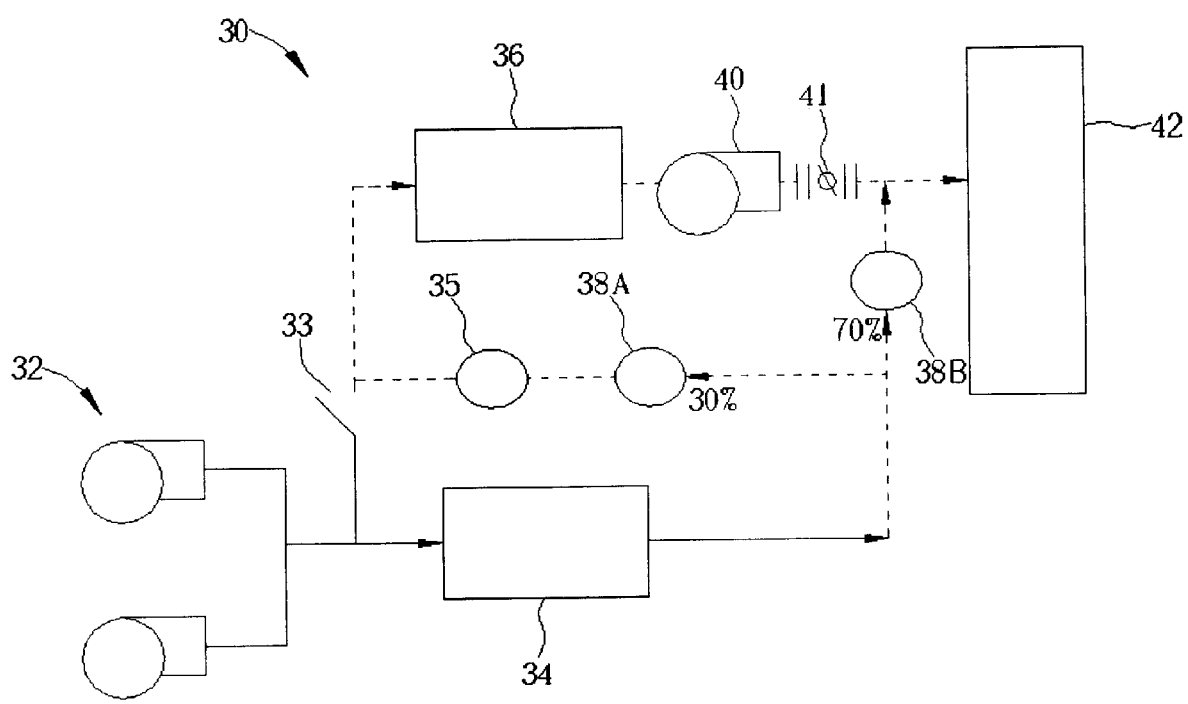
FIG. 7 is a schematic diagram of another exhaust gas processing apparatus according to the present invention.

Please refer to FIG. 7. FIG. 7 is a schematic diagram of the exhaust gas processing apparatus in another embodiment of the present invention. As shown in FIG. 7, the exhaust gas processing apparatus 30 comprises a front fan 32, a zeolite rotor concentrator 34, a dust collector 35, an active carbon adsorption system 36, two regulating valves 38A and 38B, a back fan 40, a check damper 41, and a chimney 42. It is worth noticing that the dust collector 35 is installed between the zeolite rotor concentrator 34 and the active carbon adsorption system 36. Because the zeolite rotor concentrator 34 contains silica and alumina, some solid silica and alumina particles may come out with the exhaust gas processed by the zeolite rotor concentrator 34 in enhancing mode. The solid particles may enter and damage the active carbon adsorption system 36. Therefore, a dust collector is installed to collect solid particles for preventing damages of the active carbon adsorption system 36.

In contrast to the prior art, the exhaust gas processing apparatus of the present invention includes a zeolite rotor concentrator and an active carbon adsorption system and provides different operating modes so that the present invention can solve the pause time problem, lower the setting cost, and further improve the processing efficiency.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An apparatus for processing discharging exhaust gas comprising:
    a zeolite rotor concentrator located in an inlet;
    an active carbon adsorption system located in an outlet; and
    a switch located between the zeolite rotor concentrator and the active carbon adsorption system;
    wherein the switch is for choosing the zeolite rotor concentrator and the active carbon adsorption system to connect and operate in series or in parallel.

2. The apparatus of claim 1 wherein the exhaust gas comprises volatile organic compounds (VOCs).

3. The apparatus of claim 1 wherein at least a front fan is installed in the inlet for introducing the exhaust gas into the zeolite rotor concentrator or into the active carbon adsorption system.

4. The apparatus of claim 1 wherein at least a back fan is installed in the outlet for pumping the exhaust gas processed by the active carbon adsorption system to a chimney.

5. The apparatus of claim 1 wherein a check damper is installed in the outlet for preventing the exhaust gas processed by the zeolite rotor concentrator from flowing backward to the active carbon adsorption system.

6. The apparatus of claim 1 wherein the active carbon adsorption system comprises a first adsorption tank and a second adsorption tank.

7. The apparatus of claim 6 wherein the first adsorption tank and the second adsorption tank are connected in parallel for adjusting the volume of exhaust gas.

8. The apparatus of claim 6 wherein a switch is installed between the adsorption tanks for making the first adsorption tank and the second adsorption tank operate alternatively.

9. The apparatus of claim 1 wherein the apparatus further comprises a dust collector for sifting particles before the exhaust gas enters the active carbon adsorption system.

10. An apparatus for processing discharging exhaust gas comprising:

a zeolite rotor concentrator located in an inlet;

an active carbon adsorption system located in an outlet; and a switch located between the zeolite rotor concentrator and the active carbon adsorption system;

wherein the switch is for choosing the zeolite rotor concentrator and the active carbon adsorption system to operate separately or simultaneously.

11. The apparatus of claim 10 wherein the zeolite rotor concentrator and the active carbon adsorption system are connected in series.

12. The apparatus of claim 10 wherein the zeolite rotor concentrator and the active carbon adsorption system are connected in parallel.

13. The apparatus of claim 10 wherein the exhaust gas comprises volatile organic compounds (VOCs).

14. The apparatus of claim 10 wherein at least a front fan is installed in the inlet for introducing the exhaust gas into the zeolite rotor concentrator or into the active carbon adsorption system.

15. The apparatus of claim 10 wherein at least a back fan is installed in the outlet for pumping the exhaust gas processed by the active carbon adsorption system to a chimney.

16. The apparatus of claim 10 wherein a check damper is installed in the outlet for preventing the exhaust gas processed by the zeolite rotor concentrator from flowing backward to the active carbon adsorption system.

17. The apparatus of claim 10 wherein the active carbon adsorption system comprises a first adsorption tank and a second adsorption tank.

18. The apparatus of claim 17 wherein the first adsorption tank and the second adsorption tank are connected in parallel for adjusting the volume of exhaust gas.

19. The apparatus of claim 17 wherein a switch is installed between the adsorption tanks for making the first adsorption tank and the second adsorption tank operate alternatively.

20. The apparatus of claim 10 wherein the apparatus further comprises a dust collector for sifting particles before the exhaust gas enters the active carbon adsorption system.

* * * * *